United States Patent [19]
Havlik et al.

[11] 3,750,097
[45] July 31, 1973

[54] COMPRESSED GAS SEISMIC ENERGY GENERATOR

[75] Inventors: John J. Havlik; Billy H. Towell, both of Houston, Tex.

[73] Assignee: Texaco Inc., New York, N.Y.

[22] Filed: July 8, 1971

[21] Appl. No.: 160,693

[52] U.S. Cl. ............................ 340/12 R, 181/.5 H
[51] Int. Cl. ........................................ H04b 13/00
[58] Field of Search ................ 340/8, 10, 12, 14; 181/.5 H

[56] References Cited
UNITED STATES PATENTS

| 3,276,534 | 10/1966 | Ewing et al. | 181/.5 H |
| 3,369,627 | 2/1968 | Schempf | 181/.5 H |
| 3,433,202 | 3/1969 | Sharp | 340/8 R |
| 3,434,562 | 3/1969 | Johnson | 181/.5 H |
| 2,967,048 | 3/1961 | Fontaine | 181/.5 H |
| 3,540,543 | 11/1970 | Bays | 181/.5 H |

*Primary Examiner*—Benjamin A. Borchelt
*Assistant Examiner*—H. J. Tudor
*Attorney*—Thomas H. Whaley et al.

[57] ABSTRACT

A compressed gas gun for generating a seismic pulse in water. It has a floating-action piston controlled by an auxiliary piston for releasing a compressed gas charge suddenly. It also shapes the discharge gas pattern in the water to reduce secondary bubble pulse action.

14 Claims, 3 Drawing Figures

PATENTED JUL 31 1973

COMPRESSED GAS SEISMIC ENERGY GENERATOR

BACKGROUND OF THE INVENTION

1. Field of the Invention

This invention concerns generation of seismic energy, in general. More specifically, it relates to the structure of a compressed gas seismic gun for use in underwater seismic exploration.

2. Description of the Prior Art

While it has been found that a seismic air gun for creating repeatable acoustic energy signals is feasible, the apparatus heretofore known has been found to have a major drawback. Such drawback relates to the same conditions that are created by an expolsion under water, namely, the creation of a so-called bubble pulse. The gas bubble produces a secondary seismic energy pulse, by reason of the collapse and re-expansion of the gas bubble first formed under water.

The primary seismic energy pulse generated by air gun structures heretofore known, have not differed substantially from the pulse configuration that was found objectionable, as noted above, in that a secondary bubble pulse follows some milliseconds in time after the initial expansion and so overlapping and confusing indications on a seismic record. This is especially true in reflection seismic operations. Consequently, it is an object of this invention to provide improved air gun structure that substantially eliminates any secondary seismic energy that tends to confuse a reflection or other type of seismic record.

SUMMARY OF THE INVENTION

Briefly, the invention concerns a compressed gas type of seismic energy generator. It relates to a combination with a high-pressure chamber for containing an energy pulse charge, a piston for closing one end of said chamber, and an auxiliary chamber for holding high-pressure gas to apply a greater force to said piston while it contains said energy pulse charge. In connection with the foregoing combination, the invention relates to the improvement that comprises means for instantaneously discharging said primary energy pulse charge without creating any substantial secondary bubble pulse generation.

Again briefly, the invention concerns a seismic energy generator adapted for use in a body of water. It comprises, in combination, a first chamber containing a charge of high-pressure gas, a first piston for closing an end wall of said first chamber. It also comprises a relatively small cross-sectional area passage for charging said first chamber, and a discharge port located at said piston end wall of said first chamber. Said discharge port has a flattened cross-sectional area, with a ratio of major-to-minor axes exceeding three to one.

Once more, briefly, the invention concerns a seismic energy generator adapted for use in a body of water, which comprises in combination, a first chamber for containing a predetermined volume charge of high-pressure gas. It also comprises a first floating piston, as well as means for mounting said first piston for longitudinal movement from one position for closing an end wall of said first chamber to another position. It also comprises a relatively small crosssection area passage for charging said first chamber, and a plurality of discharge ports located at said piston end wall and connected to said first chamber when said first piston is in said other position. The said ports are narrow slits with a circumferential-to-axial ratio of at least three to one, and it comprises an auxiliary chamber located at the other end of said first floating piston. The effective area of said floating piston at said auxiliary chamber end is greater than the effective area at said first chamber end. The invention also comprises means for filling said auxiliary chamber with said high-pressure gas including a restricted passage, and an auxiliary floating piston constructed of relatively light metal, as well as means for mounting said auxiliary piston for longitudinal movement from one position for closing said auxiliary chamber to another position. It also comprises a plurality of exhaust chambers adjacent to said auxiliary piston and connected tsaid auxiliary chamber when said auxiliary piston is in said other position. The said exhaust chambers have a total volume at least equal to the volume of said auxiliary chamber. The combination also comprises a plurality of check valves for preventing entering of water into said exhaust chambers, a solenoid-actuated three-way valve, and means for connecting said valve to alternatively control application of said high-pressure gas to one side of said auxiliary piston or cutting off said application while connecting said one side of the auxiliary piston to exhaust.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein.

DESCRIPTION OF THE PREFERRED EMBODIMENT

Figure 1:
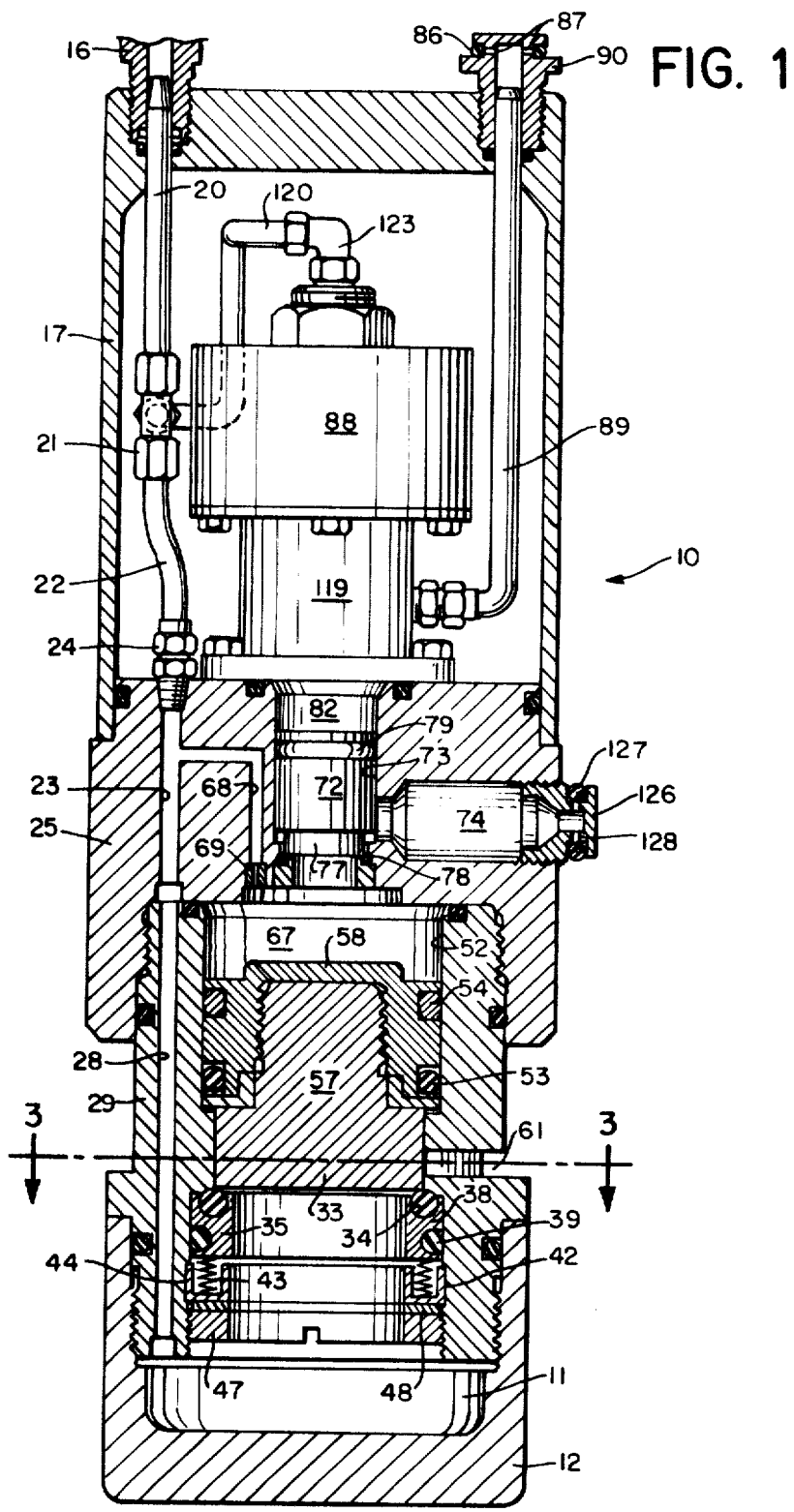
FIG. 1 is a longitudinal view, partly in cross-section, illustrating a generator according to the invention.

Referring to all of the figures of the drawings and, first of all, to FIG. 1, it will be observed that there is a seismic air gun 10 which has a first chamber 11 which is contained in a thick-walled cylindrical shaped cap 12. The chamber 11 will contain a charge of high-pressure gas, e.g., compressed air. It may vary in volume quite considerably depneding upon the total energy desired for a given seismic energy pulse. Thus, it would be the longitudinal dimensions of cap 12 that would usually be varied in order to create larger-sized chambers, as desired.

The compressed air for charging chamber 11 may be obtained from any feasible compressor (not shown). When the gun 10 is in use, the compressed air would be transmitted to the gun through a flexible hose (not shown) that would be attached to a connector 16. Connector 16 is threadably attached into the upper end (as viewed in FIG. 1) of a housing 17 of the gun 10 to which the cap member 12 is connected.

The high-pressure air wil be transmitted through the hose (not shown) via the connector 16 and internal piping and passageways which include a pipe 20, a T-joint 21, and another pipe 22 which is connected to an internal passage 23 in a solid body section 25 of the tool 10 by a threaded connector 24. The passageways continue through a connected passage 28 that extends through a connecting body portion 29 that, in turn, joins the cap 12 to the body section 25.

The chamber 11 is formed with an open end by the structure of the cylindrical cap 12. Such open end is facing upward, as viewed in the drawing, and it is closed by a floating-action piston 33 when the latter is in the lowermost position, as illustrated in FIG. 1. In closing the chamber 11, piston 33 seats upon an O-ring seating element 34 that is located in a groove at the upper edge of a short cylindrical sleeve 35.

The sleeve 35 is mounted for limited axial sliding action within a cylindrical section 38 on the interior of the connecting body portion 29 of the tool 10. The sleeve 35 is maintained against leakage of the compressed air around the outside thereof, by providing an O-ring 39. Also, the sleeve 35 is mounted with a spring bias upward (as viewed in the drawing) to keep the piston 33 seated during the first portion of movement of the piston away from its lowermost position in order to help sharpen the beginning of the generated pulse. The biasing of sleeve 35 may be accomplished in any feasible manner, e.g., by having ring 42 that has a plurality of springs 43 supported therein and that bear against the lower edge of the sleeve 35. The ring 42 may be mounted in any feasible manner and it is fixed in relation to the body 29 of the gun 10, e.g., by being fitted into a complementary groove 44 on the interior of the body 29. It is held securely in place by having a threaded ring 47 that fits beneath (as viewed in the drawing) the ring 42 with a washer 48 between them.

Piston 33 is mounted for so-called floating action within a cylinder 52 which is located concentrically on the inside of the body 29. The piston is sealed to prevent any leakage of compressed air around the edges thereof by means of an O-ring 53. In addition, there is a guide ring 54 to ensure smooth action of the longitudinal movement of the piston.

It will be noted that piston 33 has a compound structure to provide a main body portion 57 with a cap element 58. The cap 58 is constructed of relatively tough ma-terial to withstand pounding action as the piston is driven up from the illustrated position against the top of the cylindrical chamber 52, when the compressed air charge in chamber 11 is exhausted.

Figure 3:
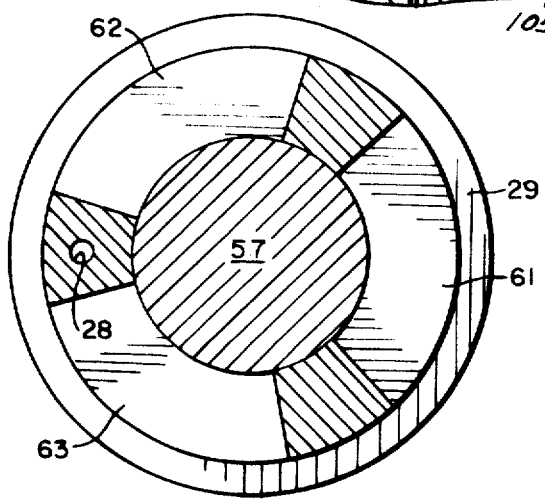
FIG. 3 is a transverse cross-section view taken along the lines 3—3 of FIG. 1, looking in the direction of the arrows.

When the piston 33 moves up away from its seated position (illustrated in FIG. 1), it releases the charge of compressed air that is contained in chamber 11 out through three transverse, or radial ports 61, 62 and 63 (see FIG. 3) through which the compressed air charge is released. However, it will be observed that the diameter of the cylindrical chamber 52 is greater than that of the bottom (as viewed in the drawing) of piston 33. Consequently, there is a net force applied downward which holds the piston firmly seated against the O-ring 34 so long as the compressed air is contained both above and below the piston.

It will be noted that the ports 61, 62 and 63 have a flattened configuration in cross-sectional area so that the ratio of the circumferential dimension to the axial dimension is quite substantial and, preferably, at least three to one. This structure for the exhaust ports of the gun creates a sharp-edged discharge pattern, and such pattern is thought to be a substantial factor in the ability of the gun to provide a seismic energy pulse which is substantially without any secondary bubble pulse energy. In addition, it is believed that other contributing factors include the rapid action that is obtained with the control elements to be described below. Also, the construction is such that the amount of water which must be bodily displaced from within the body of the gun is minimized.

Located at the other end of piston 33 from that which closes chamber 11, i.e., above as viewed in the drawing, there is an auxiliary chamber 67. It will contain the high-pressure air as the tool is charged, prior to the commencement of a seismic pulse generation. The operation will appear more fully hereafter. It may be noted that there is an internal passage 68 that connects with the passage 23 inside of the body section 25. Also, there is a restriction 69 adjacent to the point where the passage 68 connects into the chamber 67.

Above the auxiliary chamber 67 (when viewed as illustrated in the drawings), there is an auxiliary piston 72 that is preferably constructed of a light metal, e.g., aluminum, in order to reduce its inertia and promote more rapid action thereof. The piston 72 is located for floating action within a cylindrical walled, axially located opening 73 which is situated axially within the body section 25 of the tool. Surrounding the cylindrical opening 73, there are a plurality of radially situated exhaust chambers 74. They extend around, and are connected into the cylindrical opening 73 at the lower end thereof. The size of these chambers 74 is such that the total volume of all of them added together is at least equal to the volume of the chamber 67 when the primary piston 33 is in its lowermost position, as shown.

It will be noted that piston 72 has a reduced diameter end portion 77 that seats upon an O-ring 78 to seal off the auxiliary chamber 67 when piston 72 is in its lowermost position (as shown in FIG. 1). It will be observed that the arrangement is such as to open a connection from the chamber 67 to the exhaust chambers 74, whenever piston 72 moves up off the seat created by O-ring 78.

In order to provide a necessary seal between the walls of opening 73 and the piston 72, there is another O-ring 79, as illustrated. The positioning of piston 72 is controlled by application of compressed air to a space 82 at the upper end of the cylindrical opening 73. Introduction of such compressed air is controlled by a solenoid-actuated three-way valve 88, that has the details thereof shown more clearly in FIG. 2. There is an exhaust line for the valve 82 that includes a pipe 89 which leads from an exhuast port of the valve to a check valve 90. The check valve 90 acts to release discharged compressed air while preventing any reentry of water from outside the gun. This type of check valve simply employs a plurality of radial ports 87 which are closed by a flexible O-ring 86. Any excess of pressure on the inside of the valve 90 will expand the O-ring 86 andopen the valve for exhaust or outward flow, while equal or reverse pressures will leave the O-ring seated against the ports 87 to prevent reverse flow.

Figure 2:
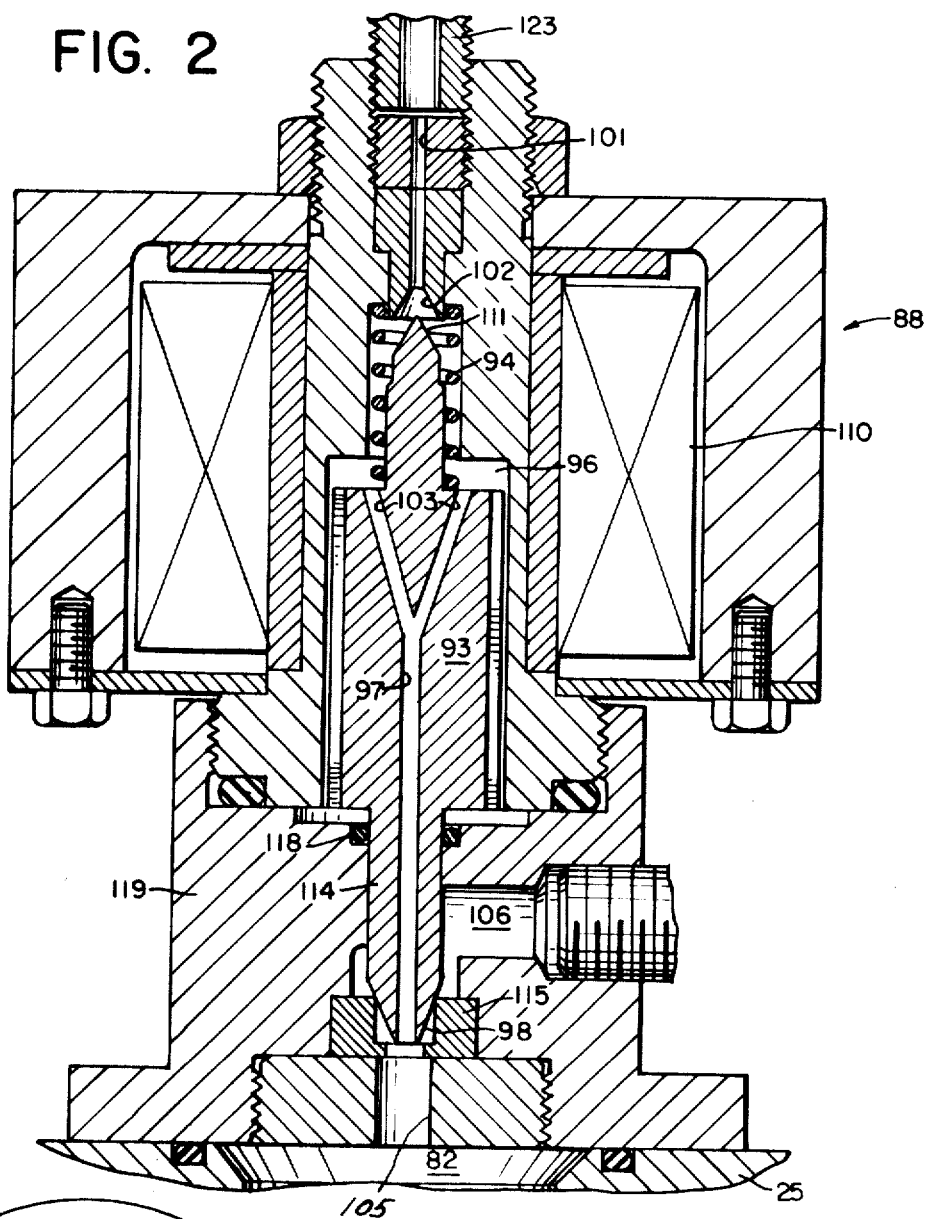
FIG. 2 is an enlarged cross-sectional view of the control valve of the generator illustrated in FIG. 1.

Referring to FIG. 2, it will be noted that the valve 88 includes a plunger 93 which is spring-biased into the position illustrated, by a coil spring 94. There is an internal passageway 97 located axially within the plunger 93, and it connects a space 96 above the plunger to the opening of a lip or nozzle 98 located at the other end of the plunger. Consequently, when the plunger 93 is in the illustrated position, there is an open passage for compressed air to flow through from an upper passageway 101 and past a valve seat 102, around the spring 94 to connect with upper branches 103 of the passage 97. Thus, air may be introduced into the space 82 via a passage 105 (FIG. 2) that may, in the alternative, be connected with an outlet port 106 (of valve 88) which connects into the pipe 89, FIG. 1 for exhausting compressed air from space 82 FIG. 2, when the valve 88 has been energized.

There is a coil 110 that is schematically illustrated which acts when energized to pull the plunger 93 up against the coil spring 94 which biases the plunger down into the position illustrated in FIG. 2. The energization of the coil 110 will, thus, cause a solid pointed tip 111 on the plunger 93 to seat against the valve 102 and close off passageway 101. At the same time, a lower extension 114 of the plunger 93 is raised up so that the nozzle 98 is lifted off a valve seat 115. This opens a connection from passage 105 via port 106 to pipe 89 (FIG. 1) that leads to exhaust via the check valve 90.

It may be noted that there is an O-ring 118 that acts between the outside of extension 114 of the plunger 93 and a body portion 119 of the valve 88.

It will be observed in FIG. 1 that there is pipe 120 that leads from the T-joint 21 to an elbow connector 123, which together make a passage for high-pressure air from the compressed air base connector 16 to the passageway 101 at the inlet end of the valve 88.

OPERATION

The operation of the particular air gun which was described above, may be followed commencing with the introduction of a gas under pressure, e.g., compressed air, into the gun via a flexible hose (not shown) which leads to the connector 16 on the gun. This compressed air will flow through the pipe 20 and via T-joint 21 and then through parallel paths including the pipe 22 (for charging the main and auxiliary chambers) while, at the same time, flowing through pipe 120 to apply compressed air to the inlet port of the three-way valve 88. It continues through the valve 88, when the solenoid is not energized, to one side of the piston 72, i.e., space 82, for controlling the charge in auxiliary chamber 67. The path through the valve is shown in FIG. 2, and it may be traced from the internal passage of the elbow 123, through passageway 101 and past seat 102. Then it continues via space 96 and through branches 103 to passageway 97 and to the passage 105 that connects into space 82.

It will be noted that the compressed air flowing in the foregoing paths to fill space 82 is relatively unimpeded and will build pressure more quickly than the compressed air flowing through pipe 22 and passage 68 into chamber 67. This is because of the restriction 69 that holds back the rate of flow over the latter path.

Consequently, as the tool is charged, the control piston 72 will be positively seated into the position illustrated in FIG. 1 closing the auxiliary chamber 67. As indicated, this is caused by the faster action of compressed air flow through the internal passages of solenoid valve 88 as compared with the flow from the source of supply into chamber 67 via the restriction 69. The positive seating is maintained after flow of the compressed air has ceased by reason of the area of the piston 72 (in space 82), which is greater than the area of the piston where it seats on the O-ring 78. The latter is at the bottom of the smaller diameter end portion 77 of the piston 72.

At the same time as the foregoing control portions of the gun are being charged with compressed air, it will flow through the parallel path of passageways 23 and 28 into the main chamber 11. Because of the volume of chamber 11, as compared with the volume of chamber 67, the main piston 33 will have pressure build-up faster in the auxiliary chamber 67 above (as viewed in FIG. 1) the piston so that it will be seated firmly into the illustrated position. Also, once the pressures have equalized, it will be firmly held with lower edge of the piston seated in a pressure-tight manner against O-ring 34 by reason of the dimensions of the whole piston 33. As has been indicated above, the piston 33 has a greater ef-fective area at the top (as illustrated in FIG. 1) relative to the effective area at the bottom where it seats on O-ring 34 to close the end wall of main chamber 11.

Now, when it is desired to generate a sudden and short-duration seismic energy pulse, the coil 110 of solenoid valve 88 will be energized, and this will pull up the plunger 93 so as to close off high-pressure air at valve seat 102 (see FIG. 2). Simultaneously, it will open a connection between passage 105 and exhaust port 106 of the three-way valve 88.

The result of the foregoing action in the valve causes the auxiliary piston 72 to be suddenly moved upward within the cylinder walls 73 and, consequently, to open a connection between auxiliary chamber 67 and the plurality of exhaust chambers 74. As was noted above, the total volume of chambers 74 is at least equal to the volume of chamber 67 and, consequently, there is a sudden drop in the pressure within chamber 67 to half or less of the original pressure. Then the pressure will continue to drop quite rapidly down to the pressure existing outside of the tool. The latter is by reason of the air exhausting from each of the exhaust chambers 74 via a plurality of check valves 126 which are provided to keep the water out of the exhaust chambers. These check valves 126 might take different forms but are preferably like the check valve 90 that was described above. Thus, each valve 126 has a stretchable O-ring 127 that closes the ring of exhaust ports 128 against any reverse flow of water or other fluid into the chambers 74, while expanding and opening these ports to permit exhaust flow of compressed air from the chambers so long as the pressure exceeds that outside the tool.

When the pressure in chamber 67 is suddenly reduced, as just described above, it causes the main piston 33 to be accelerated at a high rate and to be lifted very rapidly off of its seat against the O-ring 34. The sharpness of the opening action for the main chamber 11 is enhanced by the dynamic seal created by the structure of the sleeve 35 and ring 42 with springs 43 and related elements, which were described above. Thus, as soon as the sleeve 35, which carries the O-ring 34, reaches its uppermost position, the compressed air charged in chamber 11 will be instantaneously released out through the discharge ports 61, 62 and 63. This discharge of the compressed air from chamber 11 will generate the desired primary seismic energy pulse in the water, and at least in part by reason of the dimensions of the ports 61, 62 and 63, this energy pulse will have any secondary or delayed bubble pulse action thereof, substantially eliminated.

While a particular embodiment of the invention has been described above in considerable detail in accordance with the applicable statues, this is not to be taken as in any way limiting the invention but merely as being descriptive thereof.

What we claim is:

1. In a compressed gas type of seismic energy generator, in combination with a high pressure chamber for containing an energy pulse charge a piston for closing one end of said chamber, and an auxiliary chamber for holding high pressure gas to apply a greater force to said piston, while it contains the energy pulse charge, the improvement comprising means for instantaneously discharging said energy pulse charge without creating substantial secondary bubble pulse generation, said means for discharging said energy pulse comprising outlet port means connected to said high-pressure chamber and having a large ratio of lateral-to-longitudinal dimensions for forming a sharp-edged discharge pattern, an auxiliary piston, and means associated with said auxiliary piston for actuating said first-named piston to hold and release said energy pulse charge.

2. In a seismic generator according to claim 1, said discharging means also comprising:

exhaust chamber means connected to said auxiliary chamber when said auxiliary piston is in the released position, and check valve means for preventing fluid flow-back from the exterior of said generator into said exhaust chamber means.

3. The invention according to claim 2, wherein said exhaust chamber means has a volume at least equal to the volume of said auxiliary chamber.

4. The invention according to claim 2, further comprising:

a control chamber for holding high-pressure gas to apply a greater force to said auxiliary piston when it is holding said auxiliary chamber closed, and valve means for alternatively connecting a high-pressure gas line to said control chamber or shutting off said high-pressure gas line while simultaneously connecting said control chamber to exhaust.

5. The invention according to claim 4, wherein said exhaust chamber means has a volume at least equal to the volume of said auxiliary chamber.

6. The invention according to claim 2, wherein said auxiliary piston is constructed of relatively light material.

7. The invention according to claim 3, wherein said auxiliary piston is constructed of a relative-ly light material.

8. The invention according to claim 5, wherein said auxiliary piston is constructed of a relative-ly light material.

9. A seismc energy generator adapted for use in a body of water conprising in combination, a first chamber for containing a charge of high-pressure gas, a first piston for closing an end wall of said first chamber, a relatively small cross-section area passage for charging said first chamber, a discharge port located at said piston end wall of said first chamber, said discharge port having a flattened cross-sectional area with a ratio of major-to-minor axes exceeding three to one, an auxiliary chamber located at the other end of said first piston, said auxiliary chamber having an effective area in contact with said first piston greater than the area of said end wall, means for filling said auxiliary chamber with said high-pressure gas, and auxiliary piston means for closing said auxiliary chamber when in one position, and for connecting said auxiliary chamber to an exhaust chamber when in another position.

10. A seismic energy generator according to claim 9, wherein said exhaust chamber has a volume at least equal to the volume of said auxiliary chamber.

11. A seismic energy generator according to claim 10, further comprising:

check valve means for preventing entry of water into said exhaust chamber.

12. A seismic energy generator according to claim 11, further comprising:

a restricted passage for permitting filling of said auxiliary chamber with said high-pressure gas after said auxiliary piston has closed said auxiliary chamber, and three-way valve means for controlling acutation of said auxiliary piston means from one position to the other.

13. A seismic energy generator according to claim 12, wherein said auxiliary piston means is constructed of a relatively light material, and said three-way valve means comprises a solenoid-actuated plunger for alternatively connecting said high-pressure gas to one side of said auxiliary piston means or cutting off said high-pressure gas, and connecting said one side of auxiliary piston means to exhaust.

14. A seismic energy generator adapted for use in a body of water, comprising in combination a first chamber for containing a predetermined volume charge of high-pressure gas, a first floating piston, means for mounting said first piston for longitudinal movement from one position for closing an end wall of said first chamber to another position, a relatively small cross-section area passage for charging said first chamber, a plurality of discharge ports located at said piston end wall and connected to said first chamber when said first piston is in said other position, said ports being narrow slits with a circumferential-to-axis ratio of at least three to one, an auxiliary chamber located at the other end of said first floating piston, the effective area of said floating piston at said auxiliary chamber end being greater than the effective area at said first chamber end, means for filling said auxiliary chamber with said high-pressure gas including a restricted passage, an auxiliary floating piston constructed of a relatively light metal, means for mounting said auxiliary piston for longitudinal movement from one position for closing said auxiliary chamber to another position, a plurality of exhaust chambers adjacent to said auxiliary piston and connected to said auxiliary chamber when said auxiliary piston is in said other position, said exhaust chambers having a total volume greater than the volume of said auxiliary chamber, a plurality of check valves for preventing entry of water into said exhaust chambers, a solenoid-actuated three-way valve, and means for connecting said valve to alternatively control application of said high-pressure gas to one side of said auxiliary piston or cutting off said application off said connecting said one side of the auxiliary piston to exhaust.

* * * * *